United States Patent [19]

Kitabayashi

[11] Patent Number: 4,744,659
[45] Date of Patent: May 17, 1988

[54] METHOD OF AND APPARATUS FOR MEASURING THE SHAPE OF A WAVEFRONT

[75] Inventor: Junichi Kitabayashi, Tokyo, Japan
[73] Assignee: Ricoh Company, Ltd., Tokyo, Japan
[21] Appl. No.: 840,442
[22] Filed: Mar. 17, 1986

[30] Foreign Application Priority Data

| Mar. 20, 1985 [JP] | Japan | 60-056215 |
| Mar. 20, 1985 [JP] | Japan | 60-056216 |
| Apr. 3, 1985 [JP] | Japan | 60-070637 |
| Apr. 22, 1985 [JP] | Japan | 60-059937[U] |

[51] Int. Cl.$^4$ .............................................. G01B 9/02
[52] U.S. Cl. ..................................... 356/353; 382/43
[58] Field of Search ................. 356/353, 359, 360; 382/43

[56] References Cited

U.S. PATENT DOCUMENTS

| 3,923,400 | 12/1975 | Hardy | 356/353 |
| 4,513,441 | 4/1985 | Henshaw | 382/43 |
| 4,523,846 | 6/1985 | Breckinridge et al. | 356/353 |

OTHER PUBLICATIONS

"Interferometric Examination of Lenses, Mirrors, and Optical Systems", Forman, SPIE, vol. 163, 4-1979, pp. 103-111.

Primary Examiner—Davis L. Willis
Assistant Examiner—S. A. Turner
Attorney, Agent, or Firm—Cooper & Dunham

[57] ABSTRACT

Two light beams capable of interference with each other are applied to an area sensor while they are inclined to each other. The area sensor reads a pattern of interference fringes formed by the two light beams. The read interference fringe pattern is subjected to a Fourier transform, and then an inclination-related component is removed therefrom. Thereafter, an inverse Fourier transform is effected. The shape of the wavefront of light to be measured is determined on the basis of a phase difference between the two light beams which is known from the result of the inverse Fourier transform.

9 Claims, 9 Drawing Sheets

F I G. 1
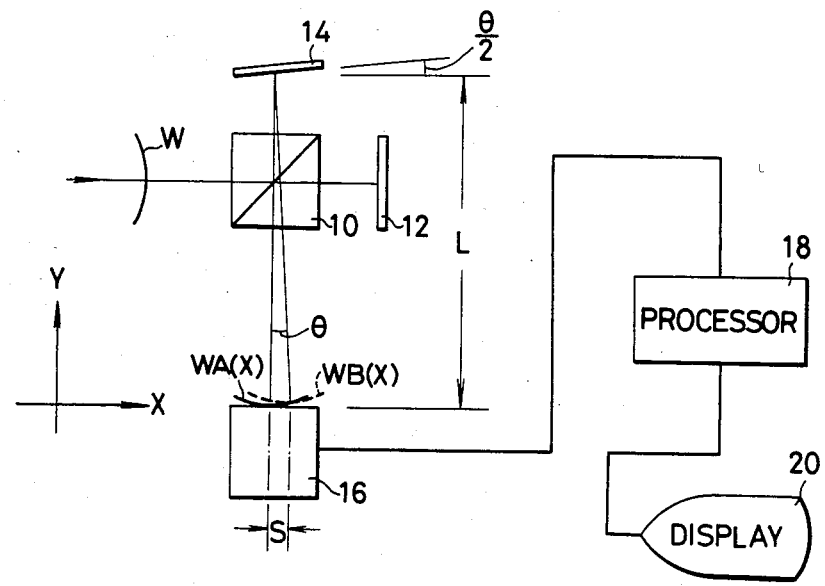
F I G. 2
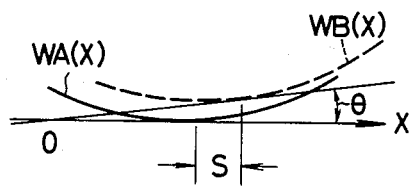

F I G. 13
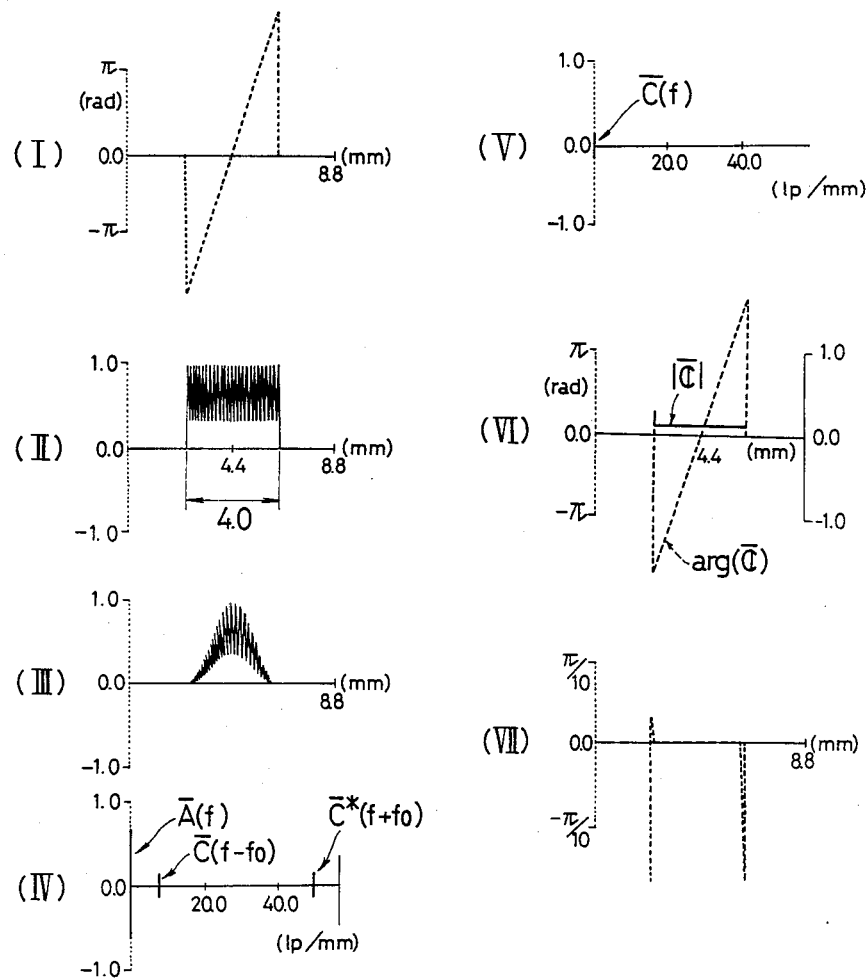

F I G. 15
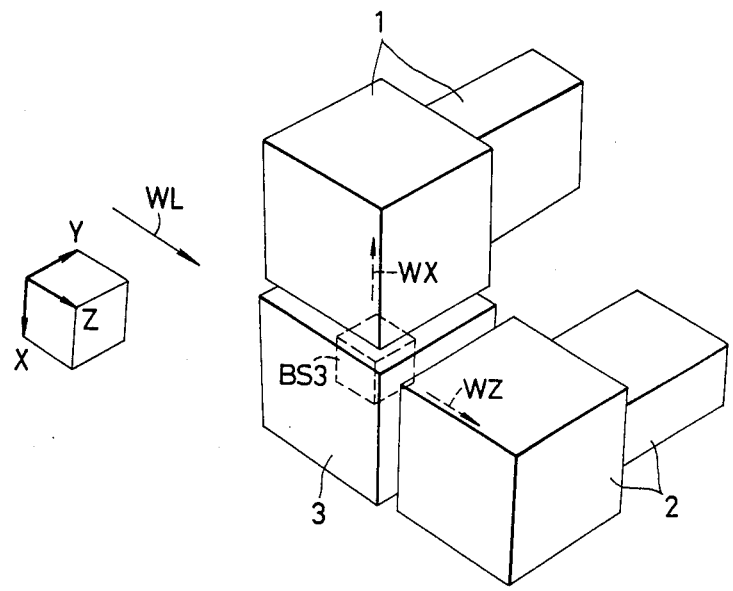
F I G. 16    F I G. 17
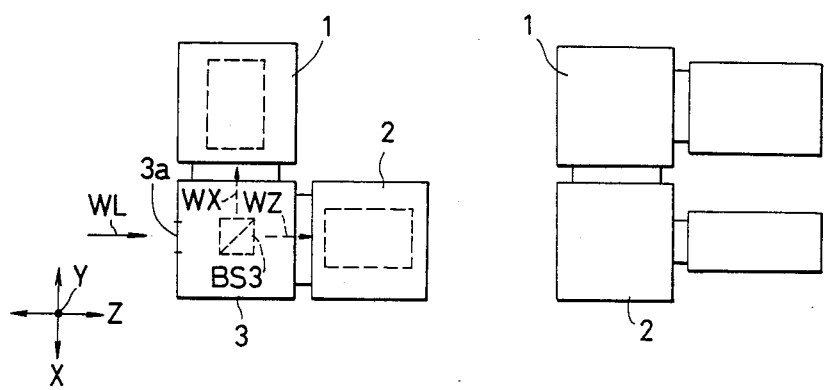

METHOD OF AND APPARATUS FOR MEASURING THE SHAPE OF A WAVEFRONT

BACKGROUND OF THE INVENTION

The present invention relates to a method of and an apparatus for measuring the shape of a wavefront of light.

It is known to determine the surface configuration of an object by measuring the shape of the wavefront of light that has been reflected by the surface of the object. It is also known to determine the optical performance of a lens by measuring the shape of the wavefront of light that has passed through the lens.

Interference of light waves has been utilized to measure the shape of wavefronts. Known measuring systems employing optical interference include the Twyman-Green interferometer and the shearing interferometer.

These systems for measuring the shape of wavefronts generally include a computation process. The computation process is however subject to errors since parameters contained in the process and dependent on the system arrangement are apt to vary due to temperature changes and vibration.

SUMMARY OF THE INVENTION

Therefore, it is an object of the present invention to provide a method of measuring the shape of a wavefront highly accurately while removing influences arising from vibration and temperature changes.

Another object of the present invention is to provide a method of measuring the shape of a wavefront through a simple computation process and with high accuracy.

Still another object of the present invention is to provide an apparatus for measuring the shape of a wavefront highly accurately while removing influences arising from vibration and temperature changes.

Two light beams capable of interference with each other are applied to an area sensor. At least one of the light beams is to be measured for the shape of its wavefront. These two light beams may be produced by dividing light having a wavefront to be measured into two equivalent light beams, or may be a light beam to be measured which is reflected by the surface of an object to be measured and a reference light beam reflected by a reference surface, the light beam to be measured bearing information relative to the object.

The two light beams are inclined to each other within a plane. Where the two light beams are equivalent, they are laterally shifted on the area sensor. Since the two light beams are capable of interference with each other, interference fringes are formed on the area sensor and read thereby.

A read interference fringe pattern is subjected to a Fourier transform, and an inclination-related component arising from the mutual inclination of the two light beams is removed from the result of the Fourier transform.

Thereafter, an inverse Fourier transform is effected to determine a phase difference between the two light beams. The shape of the wavefront is known from the phase difference. The shape of the surface of the object can be known from the shape of the wavefront.

Noise in the measurement process can be eliminated by effecting a window process on the interference fringe pattern read by the area sensor, an inverse Fourier process, and subsequently an inverse window process. The computation processes can be simplified and the measuring accuracy can be increased by appropriately establishing measuring conditions.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a schematic view of an optical system according to an embodiment of the present invention;

FIGS. 2 through 4 are diagrams explanatory of the present invention;

FIGS. 10 through 14 are diagrams explanatory of the embodiment shown in FIG. 9;

FIG. 15 is a schematic perspective view of an optical system according to a still further embodiment of the present invention; and FIGS. 16 through 19 are diagrams explanatory of the embodiment illustrated in FIG. 15.

DETAILED DESCRIPTION OF THE PREFERRED EMBODIMENTS

Figure 3:
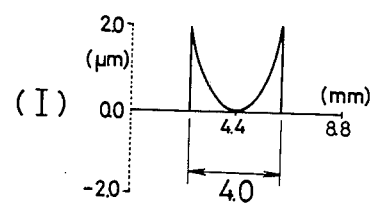
Figure 3:
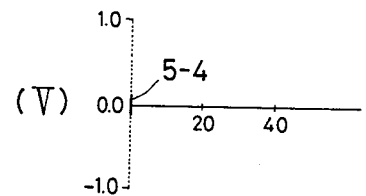
Figure 3:
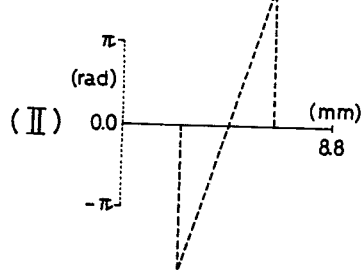
Figure 3:
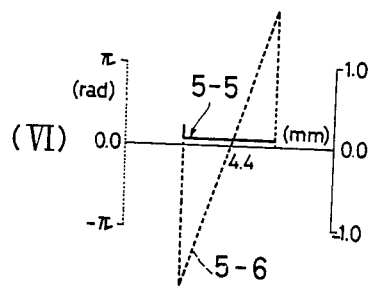
Figure 3:
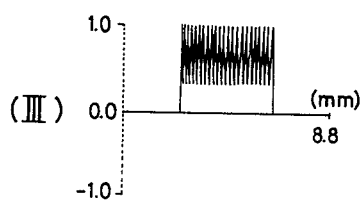
Figure 3:
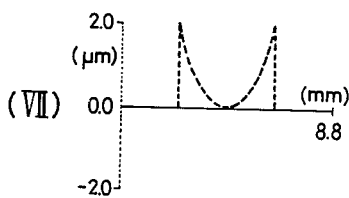
Figure 3:
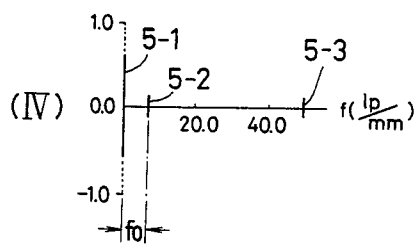
Figure 3:
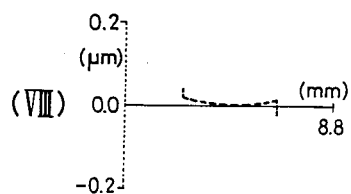

FIG. 1 shows an optical system according to an embodiment of the present invention. The optical system of FIG. 1 includes a beam splitter 10, reflecting members or plane mirrors 12, 14, and an area sensor 16. The optical system is oriented as shown with respect to the x and y directions.

The beam splitter 10 and the plane mirrors 12, 14 jointly constitute a beam separating means. The plane mirror 12 has a reflecting mirror surface lying perpendicularly to the x direction, while the plane mirror 14 has a reflecting mirror surface inclined at a small angle $(\frac{1}{2})\theta$ to the x direction.

When light to be measured which has a wavefront W enters the beam splitter 10 in the x direction as shown in FIG. 1, the light is separated into two beams by the beam splitter 10. One of the beams is reflected by the plane mirror 12 and then by the beam splitter 10 to travel along an optical path parallel to the y direction until it hits the area sensor 16. This beam has a wavefront WA(x) on the area sensor 16, which will be measured. The other beam is reflected by the plane mirror 14 to travel along an optical path inclined at $\theta$ to the y direction, and finally impinges on the area sensor 16. This beam has a wavefront WB(x) on the area sensor 16.

Therefore, the light to be measured is separated by the beam separating means into the two beams which are inclined at $\theta$ to each other in the x-y plane and fall on the area sensor 16. Where these two beams are overlapped, there are produced interference fringes which are read by the area sensor 16.

The wavefronts WA(x) and WB(x) are of the same shape. However, as shown in FIG. 2, the wavefront WB(x) is laterally shifted a small shear S and inclined the angle $\theta$ with respect to the wavefront WA(x).

Assuming that the plane mirror 14 and the area sensor 16 are spaced L from each other as shown in FIG. 1, the lateral shear or shift S is given by:

$$S = L \tan\theta \quad (1)$$

In view of the fact that the shear S and the angle $\theta$ are small and the wavefronts WA(x) and WB(x) are of the same configuration, the wavefront WB(x) can be expressed by using WA(x) as follows:

$$WB(x) = WA(x+S) + 2\pi fox \quad (2)$$

where fo is is given by:

$$fo = (1/\lambda)\tan\theta \quad (3)$$

where $\lambda$ is the wavelength of the light. fo is therefore indicative of the inclination of the wavefront WB(x) with respect to the wavefront WA(x), the dimension thereof being the dimension of a frequency.

Assuming that the complex amplitude distributions of the wavefronts WA(x), WB(x) are represented respectively by $\alpha(x)e^{jWA(x)}$, $\beta(x)e^{jWB(x)}$ ($j^2 = -1$), the light intensity distribution g(x) of the interference fringes on the area sensor 16 is expressed by:

$$g(x) = a(x) + b(x)\cos[WB(x) - WA(x)]$$

which can be written as:

$$g(x) = a(x) + (x)e^{j2\pi fox} + *(x)e^{-j2\pi fox} \quad (4)$$

where $a(x) = \alpha^2(x) + \beta^2(x)$, $b(x) = 2\alpha(x)\beta(x)$, $(x) =$ $$\frac{b(x)}{2}e^{j\Delta WA(x)}, \quad *(x) = \frac{b(x)}{2}e^{-j\Delta WA(x)},$$

and $\Delta WA(x) = WA(x + S) - WA(x)$.

$\Delta WA(x)$ respresents the phase difference between the wavefront WA(x) and the wavefront WA(x+S) which is obtained by shifting the wavefront WA(x) by S in the x direction, and will hereinafter be referred to the phase difference $\Delta WA(x)$. The equation (4) indicates the intensity of the interference fringes which contain the effect of the angle $\theta$ and the effect of the shear S. The area sensor 16 reads the intensity distribution of the equation (4) and applies same to a processor 18.

Both sides of the equation (4) are subjected to a Fourier transform, and the results are expressed by:

$$G(f) = A(f) + C(f-fo) + C*(f+fo) \quad (5)$$

The first, second, and third terms on the righthand side of the equation (5) correspond respectively to the first, second, and third terms on the righthand side of the equation (4).

The above Fourier transform is carried out by the processor 18 responsive to the output from the area sensor 16. The processor 18 may comprise a microcomputer, and the program for the Fourier transform may be the well-known FFT program, for example.

In order to determine the wavefront configuration, it is necessary to know the phase difference $\Delta WA(x)$. The terms of the equation (5) which contain information on the phase difference $\Delta WA(x)$ are C(f−fo) and C*(f+fo), and only one of these needs to be used. C(f−fo) is obtained by eliminating the first and third terms of the equation (5) with filters. As described above, fo is related to the angle $\theta$. C(f) which is derived by shifting C(f−fo) by fo in the frequency space has no inclination-related component. The computation for deriving C(f) from the equation (5) is a computation process for removing the inclination-related component and is performed by the processor 18.

C(x) is obtained by an inverse Fourier transform effected on C(f). The phase difference $\Delta WA(x)$ is given as a phase portion of (x). Specifically, $$\Delta WA(x) = \tan^{-1}\frac{Im[\,(x)]}{Re[\,(x)]} \quad (6)$$

The computation for deriving the phase difference $\Delta WA(x)$ from C(f) is referred to as an inverse Fourier computation process. Since the phase difference $\Delta WA(x)$ is given as:

$$\Delta WA(x) = WA(x+S) - WA(x)$$

the following equation is valid:

$$\frac{\Delta WA(x)}{S} \approx \frac{\partial WA(x)}{\partial x} \quad (7)$$

for the small shear S. Therefore, the shape to be determined of the wavefront WA(x) can be given by effecting the following computation on the phase difference $\Delta WA(x)$:

$$WA(x) = \frac{1}{S}\int^x \Delta WA(x')dx' \quad (8)$$

The computation of the equation (8) is referred to as an integration process. The shear S is computed as fo $\lambda$L according to the equations (1), (3) from fo determined at the Fourier transform stage.

The computation processes ranging from the Fourier computation process to the integration process are carried out for each line in the x direction which is read by the area sensor 16.

The entire process is over when all of the computation processes as described above are finished if the wavefront WA(x) is of a shape, such as a cylindrical surface, that can be identified only in the x-y plane. However, if the wavefront WA(x) has a three-dimensional shape, the plane mirror 14 is turned 90 degrees about an axis extending through the center of the mirror surface thereof and parallel to the y direction, after the above computation processes are ended. The mirror surface of the plane mirror 14 is now inclined in the z direction normal to the sheet of FIG. 1. The two beams are then shifted from each other in the x direction on the area sensor 16. The shape for one line in the z direction is computed in the same process as described above, and the shape which has already been determined for each line in the x direction is added to the shape for one line in the z direction.

The shape of the wavefront thus computed is displayed on a display 20.

FIG. 3 shows a computer-simulated method of measuring the shape of a wavefront as described above.

FIG. 3(I) illustrates the condition that a surface area, over 4 mm, of a wavefront having a radius of curvature of 1 m falls on the area sensor over a light-detecting region having a width of 8.8 mm. FIG. 3(II) shows a phase difference $\Delta WA(x)$ when the angle $\theta$ is 15.76 minutes, the distance L is 60 mm, and the shear S is 276 micrometers. FIG. 3(III) shows g(x) (the intensity of interference fringes) when a carrier of $fo = 7.246$ lp/mm is phase-modulated by $\Delta WA(x)$ (FIG. 3(II)).

The result of a Fourier transform effected on the intensity g(x) is shown in FIG. 3(IV) in which the horizontal axis indicates frequencies f (lp/mm). The first, second, and third terms on the righthand side of the equation (5) are indicated by 5-1, 5-2, 5-3, respectively.

The first and third terms are removed by filters, and the second term $C(f-fo)$ of the equation (5) is shifted fo toward the origin into C(f) denoted at 5-4 in FIG. 3(V). At this time, the inclination-related component is eliminated. An inverse Fourier transform carried out on C(f) in FIG. 3(V) results in the data of FIG. 3(VI) in which the straight line 5-5 indicates $|C|$ and the straight line 5-6 indicates the phase portion of C, i.e., $\Delta WA(x)$ (equation (6)).

FIG. 3(VII) shows $WA(x)$ computed according to the equation (8), using $WA(x)$ given as above.

FIG. 3(VIII) represents the difference:

$$WA(x)_{VIII} - WA(x)_I$$

between $WA(x)_I$ shown in FIG. 3(I) and computed $WA(x)_{VIII}$ shown in FIG. 3(VIII). Thus, FIG. 3(VIII) indicates an error which is however quite small as shown. The same measurement as above is effected for one line in the z direction normal to the x direction, so that the shape of the wavefront can be identified three-dimensionally.

Figure 4:
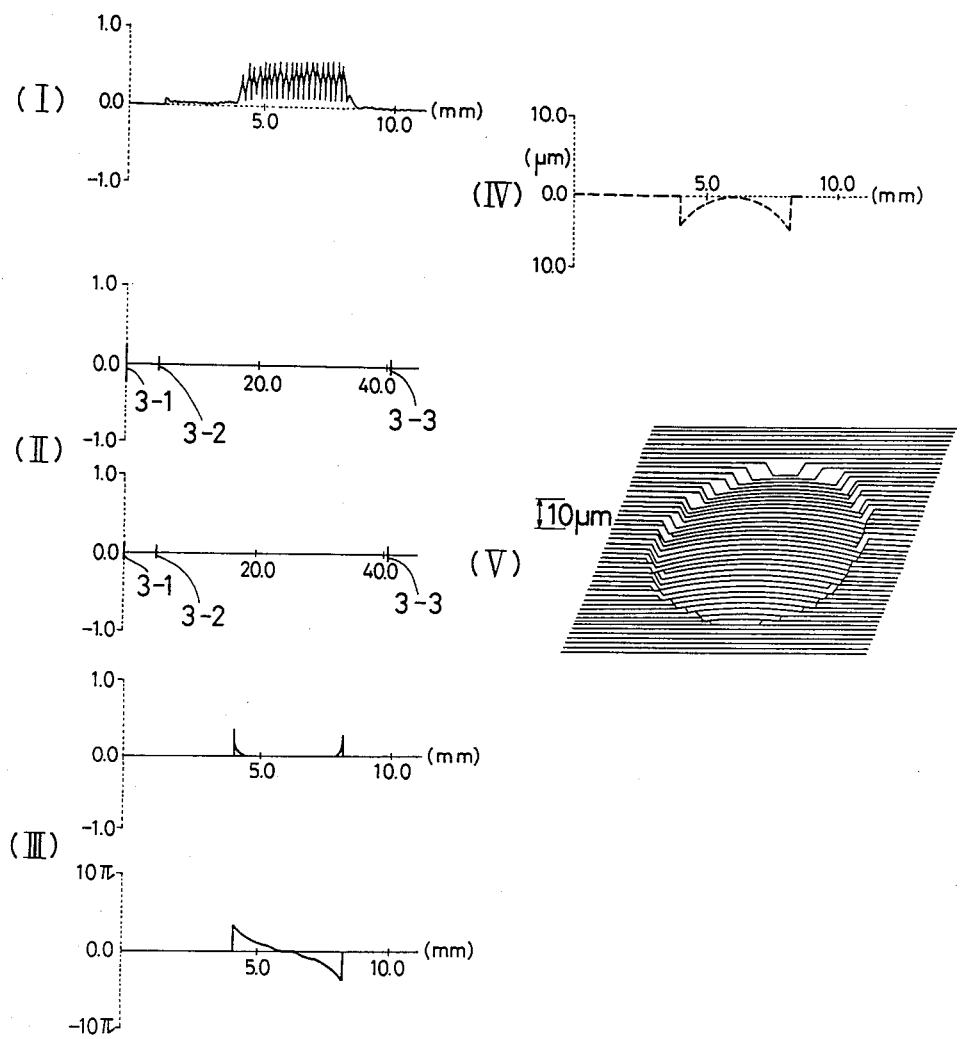

FIG. 4 shows an example in which measurements were actually made by the embodiment shown in FIG. 1. FIG. 4(I) shows data (one line) produced by reading the interference fringes in the x direction. FIG. 4(II) illustrates the result of a Fourier transform effected on the interference fringes of FIG. 4(I) which have been subjected to a window process. FIG. 4(II) shows a real part in its upper portion and an imaginary part in its lower portion. The reference numerals 3-1, 3-2, 3-3 correspond respectively to the first, second, and third terms on the righthand side of the equation (5).

FIG. 4(III) illustrates C(x) obtained by effecting the process of removing an inclinationrelated component, the inverse Fourier transform process, and an inverse window process. FIG. 4(III) shows $|C(x)|$ in its upper portion and also shows its phase portion $\Delta WA(x)$ in the lower portion. The result of the integration process performed on the phase difference $\Delta WA(x)$ is shown in FIG. 4(IV). The line shape in the x direction thus obtained is coupled to that in the z direction normal to the x direction, resulting in a three-dimensional shape, as shown in FIG. 4(V), which is displayed on a CRT display.

Certain modifications of the embodiment shown in FIG. 1 will be described below.

In FIG. 1, the two plane mirrors are employed to incline the light to be measured through a small angle in a given plane, and the beam splitter is employed to separate the light into two beams.

Figure 5:
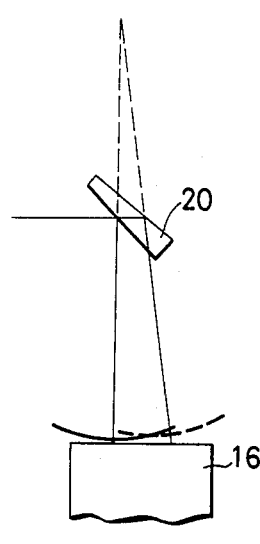
FIG. 5 is a schematic view of an optical system according to another embodiment of the present invention.

FIG. 5 shows a wadge-shaped transparent plate 20 having face and back surfaces inclined $(\frac{1}{2})\theta$ from each other for separating light to be measured into two beams inclined to each other in a given plane. The wedge-shaped transparent plate 20 thus serves as a beam separating means.

Figure 6:
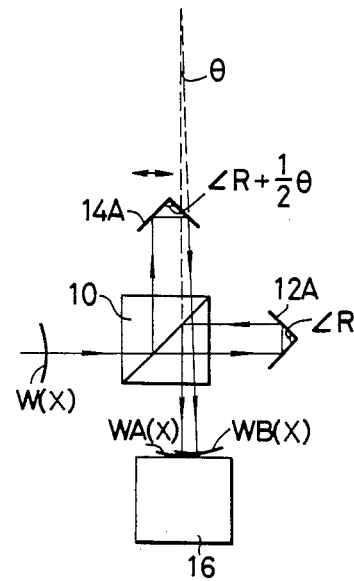
FIG. 6 is a schematic view of an optical system according to still another embodiment of the present invention.

FIG. 6 illustrates two plane prisms 12A, 14A (which may be corner-cube prisms) used as reflecting members. The vertex angle of the plane prism 12A is LR and the vertex angle of the plane prism 14A is $LR + (\theta/2)$. The shear can be varied by displacing the plane prism 14A in the direction of the double-headed arrow. Therefore, the length of the optical path required to obtain a desired amount of shear can be reduced, with the result that the overall system may be made compact.

Figure 7:
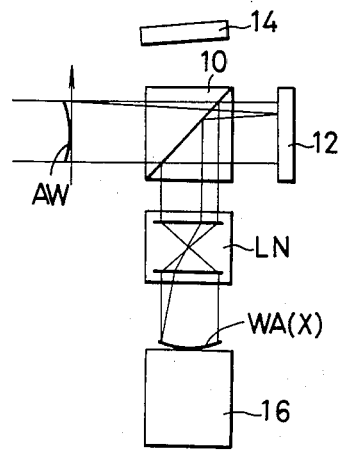
FIG. 7 is a schematic view of an optical system according to a still further embodiment of the present invention.

In the system shown in FIG. 1, as described above, the wavefront to be measured is indicated at WA(x), and is generally different from the wavefront W of light falling on the beam splitter 10.

Where the shape of a wavefront of light is to be measured in a certain position before it impinges on the beam splitter 10, such a wavefront, denoted at AW in FIG. 7, is focused by a focusing lens LN as a wavefront WA(x) to be meausured on the area sensor 16. The beam separating means is constituted of the beam splitter 10, the plane mirrors 12, 14, and the focusing lens LN. For the sake of brevity, the beam reflected by the plane mirror 14 is omitted from illustration in FIG. 7.

Figure 8:
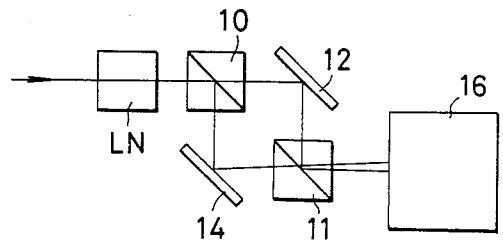
FIG. 8 is a schematic view of an optical system according to another embodiment of the present invention.

FIG. 8 is illustrative of another arrangement in which the beam separating means comprises the focusing lens LN, two beam splitters 10, 11, and the plane mirrors 12, 14. Inasmuch as the focusing lens LN and the area sensor 16 are normally relatively large in volume, they are arranged in the direction of the beam falling on the beam splitter 10. This makes the system easy to handle for improved system operability.

In the embodiments described above, the present invention is applied to the principles of the shearing interferometer.

In the shearing interferometer, the accuracy of measurement of the wavefront confiburation depends on the shear S, and hence it is necessary to know the shear S accurately for precise measurements. With conventional shearing interferometers, variations in the shear S due to vibration and temperature variations have resulted in measurement errors.

According to the present invention, however, fo corresponding to the angle $\theta$ is detected by the Fourier transform, and the shear S can accurately be determined as $L \lambda fo$ using the detected fo according to the equations (1) and (3). Determination of the shear S is part of the integration process. Therefore, even when the shear S varies dependent on vibration or temperature changes, such shear variations can be corrected on a real-time basis at all times. Consequently, the measurements are not affected by variations in the shear. Because the optical system used is simple, the method of the invention can be carried out by a compact apparatus that is resistant to vibration, and has a wide measurement range.

The measurement of the shape of a wavefront accordign to the present invention involves the Fourier transform and the inverse Fourier transform. With the interferometer system utilizing the Fourier transform and the inverse Fourier transform, the computation processes can be simplified and the measurement accuracy can be increased by establishing measuring conditions as follows:

Fourier transforms and inverse Fourier transforms are carried out in a discreate fashion. The spatial frequency fo corresponding to the angle $\theta$ and a sampling interval D are related to each other so that fo=n/D where n is an integer. The spatial frequency fo is given as fo=$(1/\lambda)\tan\theta$ as described above. In the window process prior to the Fourer transform, threshold levels are established in order to bring the window ends into conformity with the boundaries of the applied light beams for each reading line. When the spectrum is shifted, components in excess of an output frequency range for one period are shifted 1/d in the direction opposite to that in which the spectrum is shifted, where d is a sampling pitch.

An embodiment of FIG. 9 will be described below.

Figure 9:
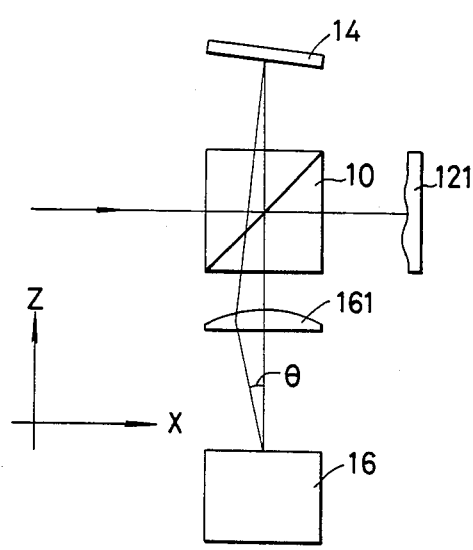
FIG. 9 is a schematic view of an optical system according to still another embodiment of the present invention.

Designated in FIG. 9 at 10 is a beam splitter as with the aforesaid embodiments, 121 an object to be measured, 14 a plane mirror, 161 a lens, and 16 an area sensor. The object 121 has a surface to be measured. The plane mirror 14 has a reflecting mirror surface serving as a reference surface. The system is arranged as illustrated with respect to the x and z directions, the y direction being normal to the sheet of FIG. 9. A line normal to the mirror surface of the plane mirror 14 is inclined a small angle to the z direction in the x-z direction.

Figure 10:
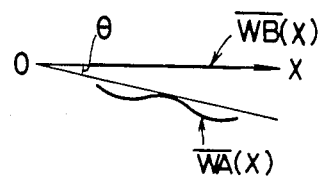

When a plane wave falls on the beam splitter 10 in the x direction, it is divided by the beam splitter 10 into a plane wave impinging on the object 121 and another plane wave falling on the plane mirror 14. The plane wave that has hit the object 121 is reflected by the surface thereof and falls as light to be measured on the beam splitter 10. The light is then reflected by the beam splitter 10 in the z direction to travel through the lens 161 toward the area sensor 16, and forms a phase shape on the light-detecting surface thereof, which corresponds to the shape of the surface to be measured. This phase shape is denoted as $\overline{WA}(x)$ as shown in FIG. 10. The phase shape should in fact be expressed by $\overline{WA}(x,y)$ as a function of x and y. The plane wave that has impinged on the plane mirror 14 is reflected thereby as a reference wave, which travels through the beam splitter 10 and the lens 161 toward the area sensor, 16, the reference wave having a plane wavefront. Since the plane mirror 14 is inclined, the reference wave, or light, falls on the area sensor 16 at the small angle of $\theta$ to the light to be measured. The reference wavefront (which is the phase shape of the reference wave) is indicated as $\overline{WB}(x)$. The light to be measured and the interference light interfere with each other to produce interference fringes on the area sensor 16.

The relative position of the wavefront $\overline{WA}(x)$ to be measured and the reference wavefront $\overline{WB}(x)$ is illustrated in FIG. 10. To facilitate analytic handling, it is assumed that the direction of $\overline{WB}(x)$ is equal to the x direction and $\overline{WA}(x)$ is inclined at $\theta$ with respect to the x direction.

Assuming that the complex amplitude distributions of $\overline{WA}(X)$, $\overline{WB}(x)$ are given as $\bar{a}(x)e^{j(\overline{WA}(s)+2\pi fox)}$, $\bar{\beta}(x)$, respectively, the intensity distribution g(x) of the interference fringes is expressed by:

$$g(x) = a(x) + b(x)\cos[WA(x) + 2\pi fox] \quad (9)$$
$$= a(x) + \bar{c}(x) e^{j2\pi fox} + \bar{c}^*(x) e^{-j\pi fox}$$

where fo is given by:

$$fo = (1/\lambda)\tan\theta \quad (3)$$

$$a(x) = \alpha^2(x), b(x) = 2\alpha(x)\beta(x), \bar{c}(x) =$$

$$\frac{b(x)}{2} e^{jWA(x)}, \text{ and } \bar{c}^*(x) = \frac{b(x)}{2} e^{-jWA(x)}.$$

Information on the wavefront $\overline{WA}(x)$ to be measured is contained in the second and third terms on the rightmost side of the equation (9).

The intensity distribution $\bar{g}(x)$ is subjected to a window process for the sampling interval, and the processed intensity distribution is then subject to a Fourier transform with respect to x to obtain a spectrum as follows:

$$\overline{G}(f) = \overline{A}(f) + \overline{C}(f-fo) + \overline{C}^*(f+fo) \quad (10)$$

The spectrum equation (10) is divided into the three groups $\overline{A}(f)$, $\overline{C}(f-fo)$, and $\overline{C}^*(f+fo)$ according to the spatial frequency fo commensurate with the angle $\theta$. The information in respect of the wavefront $\overline{WA}(x)$ to be measured is contained in single sidebands $\overline{C}(f-fo)$, $\overline{C}^*(f+fo)$, and one single sideband $\overline{C}(f-fo)$ is selected.

To select the single sideband $\overline{C}(f-fo)$, the spectrum groups $\overline{A}(f)$, $\overline{C}^*(f+fo)$ on the righthand side of the equation (10) are removed by means of filters. The single sideband $\overline{C}(f-fo)$ thus obtained is shifted fo on the frequency axis toward the origin, producing a spectrum $\overline{C}(f)$ from which the inclination-related component based on the angle $\theta$ is removed. $\overline{C}(f)$ is then subjected to an inverse Fourier transform and an inverse window process to determine $\overline{\mathbb{C}}(x)$. Since the wavefront $\overline{WA}(x)$ to be measured is equal to the phase portion of $\overline{\mathbb{C}}(x)$, $\overline{WA}(x)$ is given as:

$$WA(x) = \tan^{-1}\frac{Im[\overline{\mathbb{C}}(x)]}{Re[\overline{\mathbb{C}}(x)]} \quad (11)$$

The wavefront $\overline{WA}(x)$ to be measured should in fact be expressed as $\overline{WA}(x,y)$, as described above. However, since the area sensor 16 reads the lines one by one in the y direction, the wavefront may ve treated as the function $\overline{WA}(x)$ only in the process for effecting computations on the data read in each line.

As is well known, where a discrete Fourier transform is effected for N values at a sampling pitch d, the pitch and period of the spectrum in the frequency range are given respectively as 1/D and 1/d where D is a sampling interval that is given by D=d·(N+1).

Figure 11:
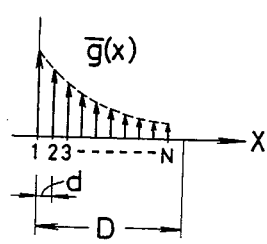
Figure 12:
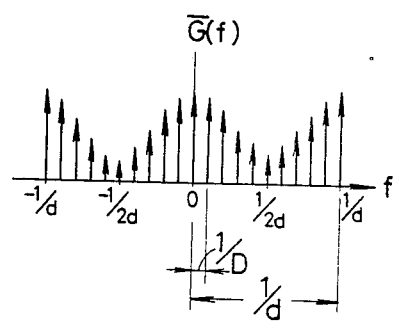

For example, where the intensity distribution $\bar{g}(x)$ to be subjected to a Fourier transform is as indicated by the broken line in FIG. 11, and is subjected to the Fourier transform for N points in the sampling interval D at the sampling pitch d, the result is indicated in FIG. 12. The spectrum $\overline{G}(f)$ is a periodic function having a pitch of 1/D and a period of 1/d.

Assuming that the spatial frequency fo=n/D where n is an integer, the fo component in the spectrum appears only in one interval, and hence $\overline{C}(f-fo)$ and $\overline{C}^*(f+fo)$ in the equation (10) are prevented from being largely spread, so that the filtering and the spectrum shifting can accurately be carried out and the computations can be simplified. To accomplish fo=n/D, there are two methods available in view of the fact that fo is given by $(1/\lambda)\tan\theta$. According to the first method, the angle $\theta$ is determined such that fo=n/D will be met by a predetermined D. According to the second method, the angle $\theta$ is accurately measured by another measuring instrument, and the sampling interval is adjusted in order to meet fo=n/D.

The first method is effective where a device capable of sampling and holding the output with the sampling pitch d being fixed is employed as the area sensor 16. The second method is effective when allowable errors for the angle $\theta$ are small where an area sensor capable of continuously producing its output with the sampling pitch d being variable is used.

The data is read by the area sensor 16 in the y direction as a plurality of lines in the x direction. The measuring accuracy can be increased by using a common value of D for each line, providing threshold levels in the direction of signal intensity to make the width of the window variable, and bringing the ends of the window into conformity with the boundaries of the applied beams for each line.

When the spectrum is shifted, the FFT processor normally issues its output in a frequency range from 0 to 1/d in FIG. 12. Therefore, when moving the sideband $\overline{C}(f-fo)$ toward the origin on the frequency axis by fo, that portion which would enter the negative range may be shifted 1/d in the positive direction for accurately and easily performing an inverse Fourier transform.

The two-dimensional wavefront $\overline{WA}(x, y)$ can be determined by inclining a line normal to the plane mirror 14 by a small angle to the z direction within a plane parallel to teh y-z plane, finding a shape only for one line in the y direction in the same manner as described above, and adding the shape that has been determined for each of the lines (parallel to each other in the y direction) in the x direction to the determined shape for one line in the y direction.

One example of computer simulation will be described below.

FIG. 13(I) shows a wavefront $\overline{WA}(x)$ to be measured on the area sensor, FIG. 13(II) the light intensity distribution of interference fringes formed by light to be measured and reference light, and FIG. 13(III) the light intensity distribution obtained by effecting a window process on the light intensity distribution shown in FIG. 13(II). The window function WI is expressed by:

$$WI = \frac{1}{2}\left(1 - \cos\frac{2\pi}{4.0}(x - 4.4)\right)$$

The ends of the window are located in conformity with the ends of the applied beams. FIG. 13(IV) shows the result of a Fourier transform carried out on the result shown in FIG. 13(III), and FIG. 13(V) shows the result obtained by shifting the spectrum of the single sideband $\overline{C}(f-fo)$ to remove the inclination-related component. FIG. 13(VI) illustrates the absolute value $|\overline{\mathbb{C}}(x)|$ and its phase portion arg $(\overline{\mathbb{C}}(x))$, i.e., WA(x), of C(x) obtained by effecting an inverse Fourier transform and an inverse window process on the spectrum shown in FIG. 13(V). FIG. 13(VII) shows the difference, i.e., a measuring error, between $\overline{WA}(x)$ shown in FIG. 13(I) and $\overline{WA}(x)$ shown in FIG. 13(VI) which is calculated as described above. It is clear from these figures that WA(x) is well measured except both ends thereof.

Figure 14:
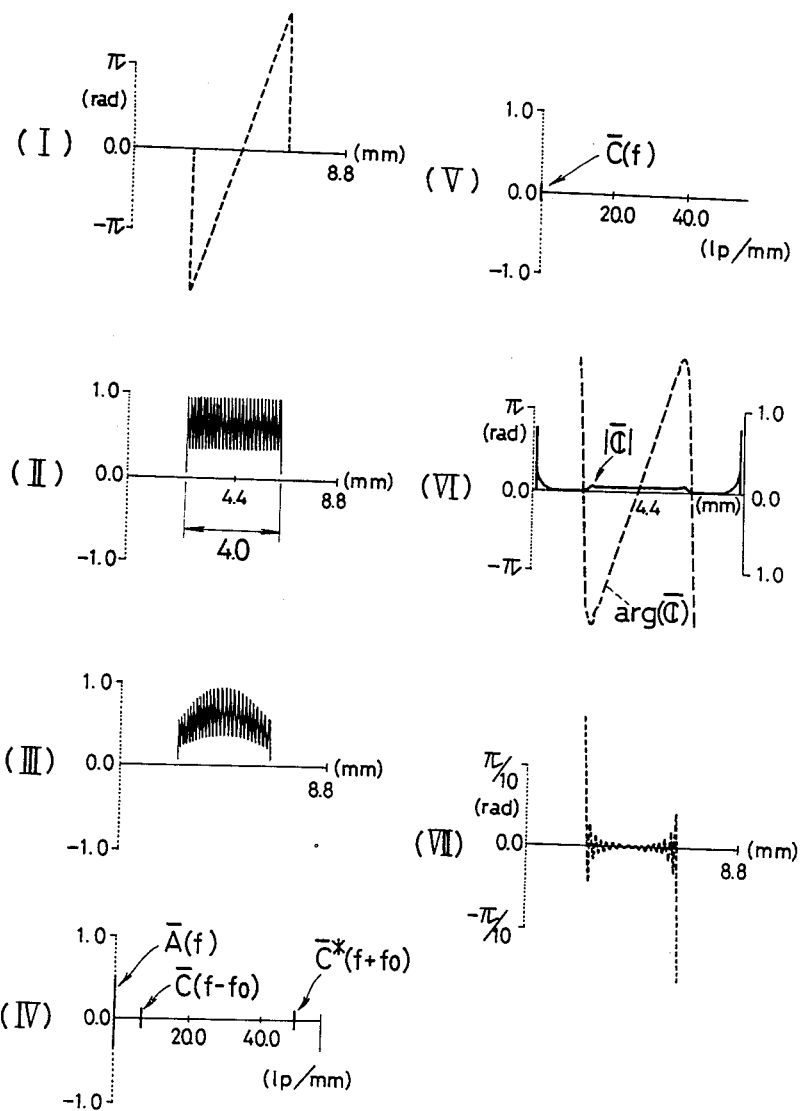

FIG. 14 is illustrative of a conventional measurement simulation process. FIGS. 14(I) through 14(VII) correspond respectively to FIGS. 13(I) through 13(VII). FIG. 14(III) shows the result obtained by effecting a window process on interference fringes $\bar{g}(x)$ (FIG. 14(II)). The window function W2 is expressed by:

$$W2 = \frac{1}{2}\left(1 - \cos\frac{2\pi}{8.8}(x - 4.4)\right)$$

The ends of the window are not located in conformity with the ends of the applied beams.

Therefore, errors are present in the entire range as shown in FIG. 14(VII).

In the aforesaid embodiments, wavefronts are first inclined in the x-y plane, for example, on the area sensor, then inclined in the y-z plane and measured, and thereafter the measurement results are combined to identify a three-dimensional shape of the wavefront measured. Stated otherwise, two measurement processes have to be performed at successive times.

However, the entire measurement can be effected in one measurement process in the following manner:

Two interference optical systems are employed to provide mutually perpendicular planes in which wavefronts are inclined to each other, on the area sensor. To this end, an apparatus for measuring the shape of a wavefront is primarily composed of two interference optical systems and a light separating means.

As shown in FIGS. 15 through 17, such an apparatus comprises a first housing 1 accommodating a first interference optical system, a second housing 2 accommodating a second interference optical system, and a third housing 3 accommodating a beam splitter BS3 serving as the light separating means, the first through third housings being integrally interconnected.

The third housing 3 has an opening 3a (FIG. 16) for introducing light WL to be measured in the Z direction toward the beam splitter BS3. The beam splitter BS3 separates the light WL into a light beam WZ which travels in the Z direction and a light beam WX which travels in the X direction. The first housing 1 is positioned in the X direction of the third housing 3, and the second housing 2 is positioned in the Z direction of the third housing 3. Therefore, the light beam WX is guided into the first housing 1, whereas the light beam WZ is guided into the second housing 2.

Figure 18:
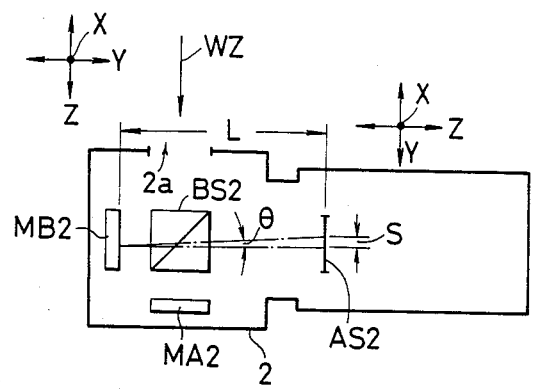

The light beam WZ is measured in the second housing 2 as follows:

As shown in FIG. 18, the second interference optical system in the second housing 2 comprises a beam splitter BS2, plane mirrors MB2, MA2, and an area sensor AS2. The second interference optical system is thus identical to the interference optical system shown in FIG. 1.

The light beam WZ entering through an opening 2a of the second housing 2 is divided by the beam splitter BS2 into a light beam in the Z direction and another light beam in the Y direction. One of the light beams is reflected by the plane mirror MA2 and the beam splitter BS2 toward the area sensor AS2.

The other light beam is reflected by the plane mirror MB2 toward the area sensor AS2. Since the plane mirror MB2 is inclined, this light beam which impinges on the light-detecting surface of the area sensor AS2 is inclined at the angle $\theta$ in the Y-Z plane to the other light beam.

Assuming that the mirror surface of the plane mirror MB2 is spaced L from the light-detecting surface of the area sensor AS2, these two light beams are laterally shifted on the light-detecting surface of the area sensor AS2 by a distance:

$$S = L \tan\theta$$

and are also inclined $\theta$ to each other. Therefore, the shape of the wavefront of the light WZ in the Y direction can be determined by the computation process including the Fourier transform and the inverse Fourier transform, as described above.

Figure 19:
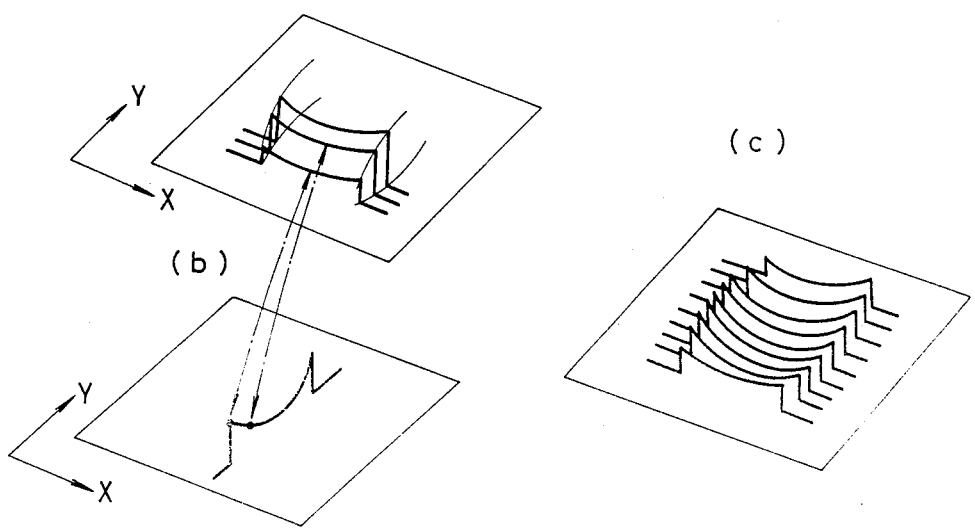

The determined wavefront configuration is shown in FIG. 19(b).

The first housing 1 houses the first interference optical system which is the same as the second interference optical system in the second housing 2, except that the direction of the shear or shift is rotated 90°.

Therefore, the wavefront configuration of the light WX in the X direction can be determined as shown in FIG. 19(a).

By combining the output from the first interference optical system and the output from the second interference optical system, the wavefront configuration corresponding to the wavefront of the light WL is determined as illustrated in FIG. 19(c).

Although certain preferred embodiments have been shown and described, it should be understood that many changes and modifications may be made therein without departing from the scope of the appended claims.

What is claimed is:

1. A method of measuring the shape of a wavefront of light, comprising the steps of:
   separating the light into two light beams to travel along optical paths lying within a plane and inclined at a small angle to each other;
   applying said light beams to an area sensor while the light beams are in said plane and laterally shifted a small distance from each other;
   effecting a Fourier transform on interference fringes measured by said area sensor, removing an inclination-related component from the result of the Fourier transform, and then effecting an inverse Fourier transform on the result of the Fourier transform to derive a phase difference between said beams; and
   effecting a computation process including an integration process in the direction in which the light beams are laterally shifted, on said phase difference, to thereby determine the shape of the wavefront of the light.

2. An interference measuring method in which light to be measured and reference light are applied to an area sensor while they are inclined a small angle $\theta$ to each other within a plane, interference fringes formed by the light to be measured and the interference light are subjected to a window processing and read in a direction parallel to said plane, a Fourier transform is effected on the read result to obtain three sepectrum groups of spatial frequencies which are separated by the angle $\theta$, one single sideband is selected from said three spectrum groups and shifted on a frequency axis by an interval corresponding to the angle $\theta$ to remove an inclination-related component, an inverse Fourier transform and an inverse window process are effected on the shifted spectrum, and a phase portion is computed from the result of the inverse Fourier transform and the inverse window process to determine a deviation of the wavefront of the light to be measured from the wavefront of the reference light on the area sensor, wherein the improvement comprises the steps of:
   determining the angle $\theta$ and a sampling interval D so that $fo = n/D$ is met where fo is a spatial frequency $(=(1/\lambda)\tan\theta$, $\lambda$: wavelength) and n is an integer;
   providing threshold levels to bring the ends of a window into conformity with the boundaries of the applied light for each line in said window process prior to said Fourier transform; and
   shifting, when the spectrum is shifted, a component in excess of one-period output frequency range by 1/d (d: sampling pitch) in the direction opposite to that in which the spectrum is shifted.

3. An apparatus for measuring the shape of a wavefront of light, comprising:
   beam separating means for separating the light into two light beams having the same wavefronts to travel along optical paths lying in a plane and inclined a small angle to each other;
   an area sensor for detecting the two light beams while they are laterally shifted a small distance from each other within said plane to read interference fringes formed by said two light beams;
   processor means for effecting at least a Fourier transform process, a process to remove an inclination-related component, an inverse Fourier transform process, and an integration process on an output from said area sensor to thereby compute the shape of the wavefront; and
   display means for displaying the computed result from said processor means.

4. An apparatus according to claim 3, wherein said light separating means comprises a single beam splitter and two reflecting members.

5. An apparatus according to claim 3, wherein said light separating means comprises at least one beam splitter, two reflecting members, and a focusing lens.

6. An apparatus according to claim 4 or 5, wherein each of said two reflecting members comprises a plane mirror.

7. An apparatus according to claim 4 or 5, wherein each of said two reflecting mirrors comprises a plane prism or a corner-cube prism, one of said reflecting members being capable of inclining light reflected thereby at a small angle to the direction in which the light has been applied to said one reflecting member, said one reflecting member being displaceable in a direction normal to said direction.

8. An apparatus according to claim 3, wherein said light separating means comprises a wedge-shaped transparent plate having face and back surfaces inclined a small angle to each other.

9. An apparatus comprising means for: measuring the shape of a wavefront of light by separating the light into two light beams to travel along optical paths lying in a plane and inclined a small angle to each other, applying said two light beams to an area sensor while they are laterally shifted a small distance from each other in said plane, effecting a Fourier transform on interference fringes measured by said area sensor, removing an inclination-related component from the result of the Fourier transform, effecting an inverse Fourier transform on the result of the Fourier transform to derive a phase difference related to said light beams, and effecting a computation process including an intergration process in the direction in which the light beams are laterally shifted on said phase difference, to thereby determine the shape of the wavefront, and said apparatus further comprising:
two interference optical systems comprising respective area sensors and arranged such that the directions in which the beams applied to the area sensors are laterally shifted are laterally shifted are perpendicular to each other; and light separating means for separating the light into the light beams and introducing the light beams to each of said interference optical systems, said light separating means being disposed in front of each of said interference optical systems.

* * * * *